E. F. & H. A. LOCKWOOD.
BAKER'S PAN.
APPLICATION FILED JAN. 30, 1911.
1,047,256.
Patented Dec. 17, 1912.
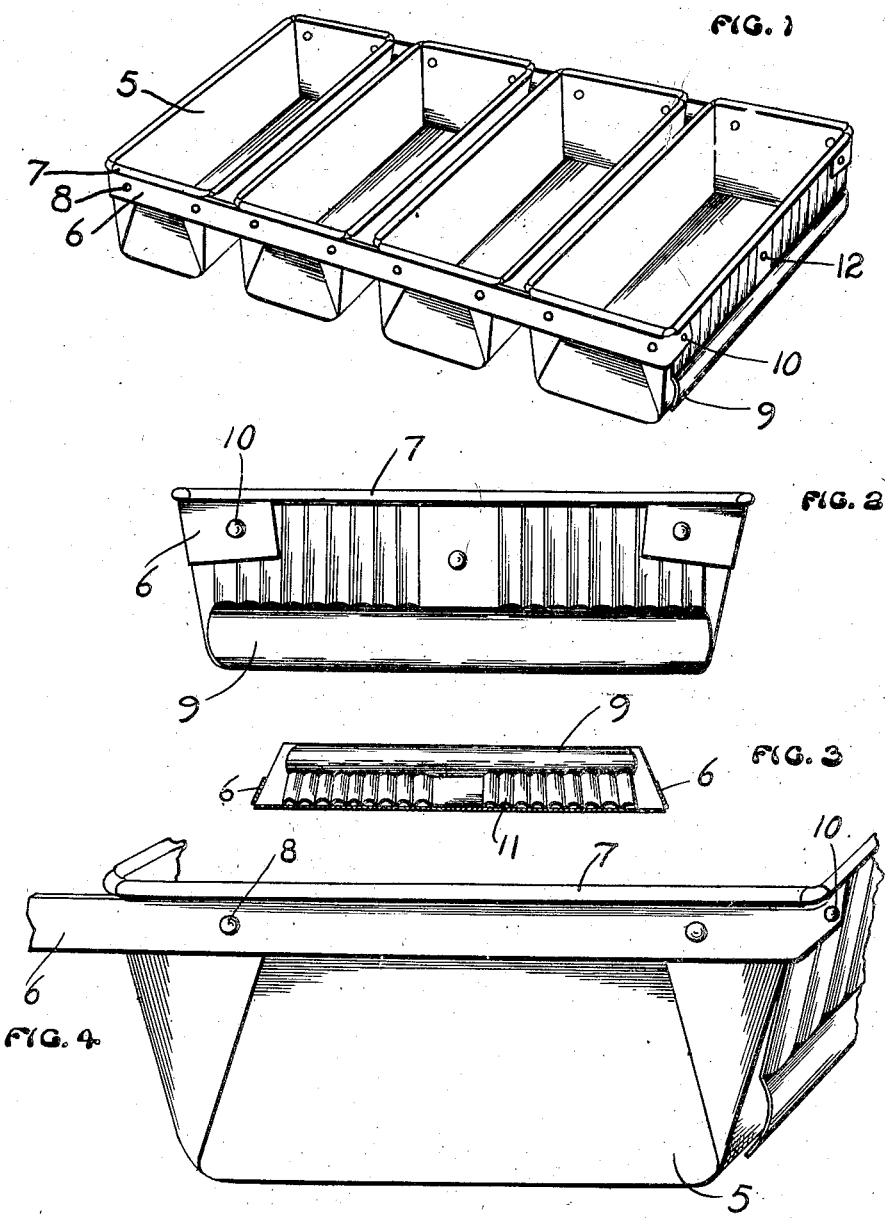

UNITED STATES PATENT OFFICE.

EDWIN F. LOCKWOOD AND HARRY A. LOCKWOOD, OF BELLEVUE, KENTUCKY.

BAKER'S PAN.

1,047,256.

Specification of Letters Patent. Patented Dec. 17, 1912.

Application filed January 30, 1911. Serial No. 605,395.

*To all whom it may concern:*

Be it known that we, EDWIN F. LOCKWOOD and HARRY A. LOCKWOOD, citizens of the United States of America, and residents of Bellevue, county of Campbell, and State of Kentucky, have invented certain new and useful Improvements in Bakers' Pans, of which the following is a specification.

This invention relates to bakers' pans and has for an object to produce improved means for protecting the ends of a series of connected pans.

A further object is to produce a protective plate or wing for the end pans of a series of connected pans, which will protect the end faces of the series, the bottoms of the end pans, and will also provide for a circulation of air around the lateral walls of the end pans, and consequently allow the loaves in the end pans to be browned uniformly on all sides.

A further object is to produce a protective plate or wing which will guide the baker's peel under the pan, and which will yield or give when struck by the peel, and, consequently yieldingly transmit the force of the blow to the pan.

These and other objects we attain by means of a protective plate or wing embodying the features herein described, and illustrated in the drawings accompanying and forming a part of this application.

In the drawings, Figure 1 is a perspective view of a series of connected pans equipped with a protective plate or wing embodying our invention. Fig. 2 is an end elevation of a pan equipped with the wing shown in Fig. 1. Fig. 3 is a partial end view of the pan shown in Fig. 2, on a reduced scale; the pan being shown inverted and with the coil and ends of the side bars broken away for convenience of illustration. Fig. 4 is a fragmental perspective view on an enlarged scale of the pan shown in Fig. 2.

The protective plates which are now in use, stiffen the wall of the pan on which they are located and prevent it from being distorted, but they transmit the force of the blows to which they are subjected to the bottom of the pan and distort it by causing it to buckle.

One of the features of our invention is to provide a protective plate or wing, which will protect the walls of the pan and also prevent the bottom from being buckled or distorted.

In the drawings, we have shown a number of rectangular baking pans 5, located side by side, with a convenient space between each pan, and the several pans are secured together by means of bars 6, which extend across the end faces of the pans, and are located immediately adjacent to the coils 7 of the pans, and are secured in place by means of rivets 8, which extend through the bars and the end walls of the pans. The ends of each bar 6 are bent at right angles, so as to extend parallel to the lateral faces of the end pans. A protective plate 9 is located on the outer lateral face of each end pan, and is engaged by the turned-over ends of the bars 6. The ends of the bars are secured to the outer lateral walls of the end pans by means of rivets 10, which extend through the bars, the wings 9, and the walls of the pan, and, consequently aid in securing the wings to the pans. Each wing 9 consists of an upper portion, which is provided with vertically extending corrugations 11, and a lower portion, which stands out from the adjacent wall of the pan and is curved inwardly toward the bottom of the pan. The lower edge of the wing is approximately in the plane of the bottom of the pans.

A rivet 12 is located midway between the ends of the wing and aids the rivets 10 in securing the wing in place on the end pan. Both the rivets 10 and the rivets 12 are located near the top of the wing, so that its lower portion stands out free from the pan and is capable of a slight amount of motion relatively to the pan, due to the elasticity or "give" of the metal of which the wing is formed. The upper edge of the wing is located a little below the coil 7 of the pan, so as to permit a free circulation of air through the passages formed between the pan and the wing, by the vertical corrugations 11. With this arrangement, the side of the loaf, located adjacent to the wing 9, is browned to the same extent as the rest of the loaf, for the reason that the wing 7 does not have to be heated up before the heat of the oven is imparted to the portion of the loaf located adjacent to the wing. The circulation of air through the vertical corrugations imparts the same amount of heat to the loaf, through the end walls of the series of pans, as is imparted through the intermediate walls of the series.

The wing 9, in addition to protecting the outer lateral walls of the end pans, prevents the bottoms of these pans from being buckled by the force of a blow from the baker's peel. When the wing is struck by the peel, the force of the blow is not transmitted to the bottom of the pan, but is yieldingly transmitted to the top portion of the pan, which is reinforced by the coil 7 and also by the bars 6. In addition to protecting the pans and preventing them from being distorted, the curved lower portion of the wing guides the baker's peel under the pan, and thereby simplifies the operation of removing the pans from the oven. Protective wings embodying the features of the wings herein described may be employed on any kind of a pan, and may be secured to the pan in any convenient manner.

What we claim is:—

1. In combination with a baker's pan, a protective wing secured to one wall of the pan and provided with corrugations which form open ended air passages between the wing and the pan.

2. In combination with a baker's pan, a protective wing secured to one wall of the pan and provided with corrugations which form open ended air passages between the wall and the pan, and a curved portion which forms a guide for the baker's peel.

3. In combination with a baker's pan, a protective wing secured near its upper edge to one wall of the pan and provided with vertical corrugations which form air passages between the wing and the pan, and a curved lower portion which extends downwardly adjacent to the bottom of the pan but stands away from the pan.

4. In combination with a baker's pan, a protective wing located on the side of the pan and secured in place along its upper edge only, and having vertically extending corrugations, forming air passages, open at each end and located between the pan and the wing.

EDWIN F. LOCKWOOD.
HARRY A. LOCKWOOD.

Witnesses:
WALTER F. MURRAY,
E. W. McCALLISTER.